(12) United States Patent
Sixt et al.

(10) Patent No.: US 8,336,692 B2
(45) Date of Patent: Dec. 25, 2012

(54) FAN DRIVE

(75) Inventors: Eberhard Sixt, Magstadt (DE); Kurt Klein, Vaihingen (DE); Michael Jacob, Stuttgart (DE)

(73) Assignee: Behr GmbH & Co. KG, Stuttgart (DE)

( * ) Notice: Subject to any disclaimer, the term of this patent is extended or adjusted under 35 U.S.C. 154(b) by 426 days.

(21) Appl. No.: 12/654,182

(22) Filed: Dec. 14, 2009

(65) Prior Publication Data

US 2010/0163362 A1 Jul. 1, 2010

(30) Foreign Application Priority Data

Dec. 19, 2008 (DE) .......................... 10 2008 063 702

(51) Int. Cl.
*F04D 29/58* (2006.01)
*F01P 7/02* (2006.01)
(52) U.S. Cl. .................. 192/58.4; 192/113.24
(58) Field of Classification Search .................. 192/58.4, 192/113.24; 416/169 A
See application file for complete search history.

(56) References Cited

U.S. PATENT DOCUMENTS

| 4,153,389 | A  | * | 5/1979 | Boyd ........................ 416/169 A |
| 5,180,003 | A  |   | 1/1993 | Kouzel et al. |
| 5,555,963 | A  |   | 9/1996 | Martin |
| 5,937,983 | A  |   | 8/1999 | Martin et al. |
| 6,206,639 | B1 | * | 3/2001 | Light et al. ................ 416/169 A |
| 2009/0064946 | A1 | | 3/2009 | Schultheiss et al. |

FOREIGN PATENT DOCUMENTS

| DE | 40 41 568 | 6/1992 |
| DE | 42 06 051 | 9/1993 |
| DE | 43 35 342 | 4/1995 |
| DE | 10 2007 037 733 | 2/2008 |

* cited by examiner

*Primary Examiner* — Rodney Bonck
(74) *Attorney, Agent, or Firm* — Walter Ottesen

(57) ABSTRACT

A fan drive (1) includes a drive shaft (6), a fluid friction clutch (2) as well as a fan (3). The fluid friction clutch (2) includes a drive disc (5) as well as a housing (4) having a front-end housing part (4*a*) and a rear-end housing part (4*b*). The housing (4) is journalled on a drive shaft (6) via at least one bearing (7). Air flows against the fluid friction clutch (2) and the fan (3) in flow direction (L). An air-conveying unit (13) is mounted in flow direction (L) behind the fluid friction clutch (2). The fan drive is especially for a motor vehicle.

18 Claims, 2 Drawing Sheets

FAN DRIVE

CROSS REFERENCE TO RELATED APPLICATION

This application claims priority of German patent application no. 10 2008 063 702.5, filed Dec. 19, 2008, the entire content of which is incorporated herein by reference.

FIELD OF THE INVENTION

The invention relates to a fan drive and especially a fan drive for a motor vehicle.

BACKGROUND OF THE INVENTION

Fan drives are utilized for cooling the internal combustion engine of a motor vehicle and are, as a rule, mounted in the engine compartment of the motor vehicle behind a heat-transfer unit or an assembly unit of several heat-transfer units, for example, a coolant radiator, a charge-air cooler and/or a coolant condenser.

It is known to not drive the fan directly by the engine but, instead, by a controlled clutch, for example, a fluid friction clutch. Because of the control, an efficient and energy-saving cooling is achieved wherein the fan is only switched on when cooling is needed and, if needed, at different rpms adapted to the cooling requirement. The fluid friction clutch operates in accordance with the principle of shear friction. Here, a viscous medium, especially silicone oil, is used for the torque transmission. The torque transmission takes place with slippage wherein the output rpm is less than the drive rpm. For this reason, heat arises because of the friction and this heat must be conducted away to maintain a permissible operating temperature of the clutch. Accordingly, the clutch has cooling ribs on the outer side of its housing over which ambient air passes. This cooling effect is not adequate at higher capacities, especially, at higher drive rpms. The danger here is presented that the silicone oil will overheat and this can then lead to the silicone oil losing its transfer capability which can lead to a blockage of the clutch.

For this reason, a second fan wheel is suggested in German patent publication 10 2007 037 733. This second fan wheel is mounted ahead of the fluid friction clutch in the air flow direction and so effects an additional targeted cooling of the forward housing part.

It is further known to control the rpm of a fluid friction clutch electromagnetically as disclosed, for example, in U.S. Pat. No. 5,937,983. For this purpose, an electromagnetic coil is stationarily mounted in the air flow direction ahead of or rearward of the fluid friction clutch. The electromagnetic coil actuates a valve mechanism disposed in the interior of the clutch. As disclosed in U.S. Pat. No. 5,555,963, the electromagnetic coil can also be mounted in the interior of the fluid friction clutch, especially, in the supply chamber.

The fluid friction clutch is often journalled via its housing on a drive shaft which can also be the crankshaft of the internal combustion engine. The fluid friction clutch is in this way preferably journalled via a roller bearing. This roller bearing is disposed at the rear side of the clutch, that is, the side facing toward the internal combustion engine. Since the fluid friction clutch also carries the weight of the fan, this roller bearing is subjected to intense loads and is furthermore not adequately cooled because the main cooling-air flow passes over the forward side of the clutch housing.

SUMMARY OF THE INVENTION

It is an object of the invention to improve the cooling and especially the cooling of a fluid friction clutch in a fan drive of the kind described above so that no overheating occurs for the entire fluid friction clutch even at high drive capacities and/or at high drive rpms.

The fan drive of the invention includes: a drive shaft; a fluid friction clutch including: a drive disc and a housing; a bearing for rotatably journalling the housing on the drive shaft; a fan; the fan and the fluid friction clutch being arranged to facilitate an air flow moving in a flow direction (L) toward the fan and the fluid friction clutch; and, an air conveying unit mounted behind the fluid friction clutch as viewed in the flow direction (L).

According to a feature of the invention, an air conveying unit is mounted at the rear side of the fluid friction clutch. The air conveying unit causes cooling air to reach the rear side of the clutch and especially also the region of the roller bearing supporting the clutch. In this way, an intensified convective removal of heat on the rear side of the clutch is achieved with the result that the permissible limit temperatures are not exceeded, especially not the permissible bearing temperature and the permissible temperature of the viscous medium, especially, of the silicone oil.

According to a preferred embodiment, a blower is provided as the air conveying unit and especially a blower wheel which rotates at the drive rpm of the clutch. The blower wheel is therefore fixedly connected to the drive shaft of the clutch and is preferably mounted next to the clutch bearing. Because of the arrangement of the invention of the blower at the rear side, the blower draws air by suction from the pressure region of the fan which increases the conveying power of the blower. In this way, cooling air can be blown in a targeted manner onto the rear side of the clutch, that is, the rear end housing part. Preferably, radially extending cooling ribs can be arranged on the rear-end housing part to improve the cooling action and air conduction.

According to an especially preferred embodiment of the invention, an air-guiding unit is assigned to the air-conveying unit, that is, the blower. The air-guiding unit is configured to be shell-shaped or hood-shaped and therefore is characterized as a blower collar having a collar ring surrounding the blower. Because of the blower ring, the drawn-in cooling air flow is channeled and guided radially outwardly and over the rear side of the clutch housing in a targeted manner.

According to another preferred embodiment of the invention, the air-guiding unit or blower collar is, at the same time, a fan hub, that is, it supports the fan and is attached to the clutch housing.

According to a further preferred embodiment of the invention, an air-flow connection is provided between the front end of the clutch and the rear end thereof. Because of this air-flow connection, the cooling air, which is drawn in from the rear-end blower, reaches the front end of the clutch and mixes there with the oncoming flow of air.

According to a further preferred embodiment of the invention, the air-flow connection is configured as a deflection channel which deflects the rear-end cooling air flow out of an axial flow direction and into an approximately radial flow direction so that the rear-end cooling air is blown into the incoming fan air flow. The rear-end cooling air is blown in a manner similar to the effect of an injector. In this way, a disturbance of the front-end flow relationships is avoided and a low-loss inflow of the fan is achieved especially in the region of the roots of the vanes.

According to a further preferred embodiment of the invention, cooling ribs are arranged on the front end of the clutch, that is, on the front-end clutch housing. The cooling ribs preferably extend radially and effect a clean fan inflow in combination with a rear-end drawn-in cooling air flow.

According to a further preferred embodiment of the invention, the blower is configured as an axial blower whereby an axial alignment of the cooling air flow onto the rear end of the clutch housing is achieved. However, configurations as half-axial blowers or as radial blowers are possible.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
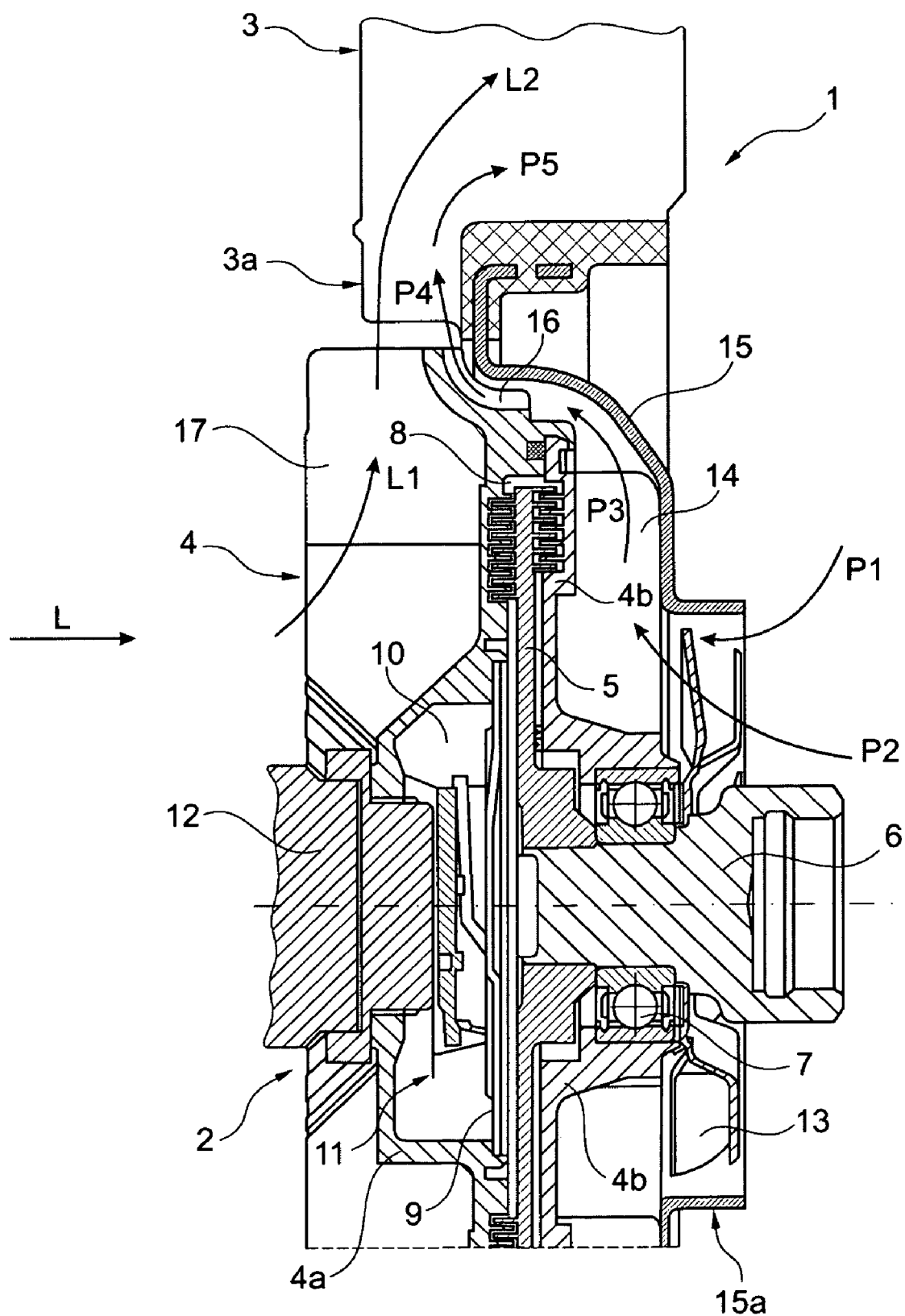
FIG. 1 is a section view of the fan drive according to the invention.

FIG. 1 shows a section view of a fan drive 1 according to the invention. The fan drive includes a fluid friction clutch 2 and a fan 3 configured as an axial fan. The fan 3 is driven by the fluid friction clutch 2.

The fluid friction clutch 2 includes a housing 4 which is configured of a front-end housing part 4a and a rear-end housing part 4b. The terms forward or front-end housing part and rear-end housing part should be viewed with reference to the air flow direction shown by arrow L in FIG. 1. In the following, the fluid friction clutch 2 is also referred to as just clutch 2 and includes a drive disc 5 which is attached to a drive shaft 6 so as to rotate therewith and is driven thereby. The housing 4 is rotatably journalled relative to the drive shaft 6 via a bearing configured as a roller bearing 7. The housing 4 and the drive disc 5 conjointly define a labyrinth-like work chamber 8 which is configured by a plurality of gaps fillable with a shear liquid, especially, silicone oil.

The work chamber 8 is partitioned from the reservoir chamber 10 by a partition wall 9. A valve mechanism 11 is mounted in the reservoir chamber 10. The forward housing part 4a is also referred to as a cover 4a and an electromagnetic control unit 12 is fixedly mounted therein. The electromagnetic control unit 12 actuates the valve mechanism 11 and controls the circulation of silicone oil between the supply reservoir 10 and the work chamber 8.

The torque, which is introduced by the drive disc 5, is transferred to the housing 4 by liquid friction in the work chamber 8. The principle of the fluid friction clutch including its control is disclosed in U.S. Pat. Nos. 5,555,963 and 5,937,983 incorporated herein by reference.

The drive shaft 6 is connected to the internal combustion engine of a motor vehicle, for example, with the crankshaft of the engine. The engine is not shown but is disposed to the right in FIG. 1, that is, behind the fluid friction clutch 2 as viewed in the air flow direction L. The fan 3 moves cooling air for the cooling of the engine, that is, the fan 3 draws air by suction through a cooler module (not shown), for example, comprising a coolant cooler, charge cooler and/or condenser.

According to the invention, a blower 13 is mounted on the rear end of the clutch 2 next to the roller bearing 7. The blower 13 is connected to the drive shaft 6 so as to rotate therewith and therefore runs at the rpm of the drive shaft. In the embodiment shown, the blower 13 is configured as an axial blower whose cooling air is drawn from the rear end region of the clutch 2, that is, the pressure end of the fan 3. The blower 13 moves air over the rear side of the clutch 2 in correspondence to the flow arrows P1, P2, P3 as shown in FIG. 1.

To increase the cooling effect, cooling ribs 14 are arranged on the outer side of the rear-end housing part 4b. The cooling ribs 14 preferably extend in the radial direction. The rear side of the clutch 2 is delimited by a shell-shaped or hood-shaped air-conducting unit 15, which, simultaneously, defines a connecting member between fan 3 and housing 4 of the clutch 2. The air-conducting unit 15, which functions also as a fan hub, is connected to the rear-end housing part 4b with fastening elements (not shown), for example, threaded fasteners. The air-conducting unit 15 (also known as a blower collar 15) includes a frame ring 15a at the air-inlet end. The frame ring 15a surrounds the blower wheel 13. In this way, and in combination with the axial blower wheel 13, a cooling air flow results which is directed onto the rear-end housing part 4b. The cooling air flow is thereafter deflected in a radial direction outwardly in correspondence to arrow P3.

An air-flow connection is arranged between the rear side of the clutch 2 and the forward side, that is, the air entry region 3a for the fan 3. The air-flow connection is configured as a deflection channel 16. The cooling air flow from the rear side of the clutch 2 reaches the forward end and passes into the air entry region 3a of the fan 3 through the deflection channel 16. This cooling air flow is indicated by flow arrow P4. In the radial outer region, preferably radially-extending cooling ribs 17 are arranged on the front-end housing part 4a, that is the cover of the clutch 2. The cooling ribs 17 deflect the air flow, which impinges on the clutch 2 in the direction of arrow L, in a radial direction corresponding to arrow L1. The flow in the entry region 3a of the fan 3 is shown by the flow arrows P5 and L2 which shows that the flows from the rear side and the forward side of the clutch combine to a common fan flow relatively free of loss. The fan flow, especially in the base region of the vanes, is thereby not disturbed; rather, an improvement of the air flow is achieved as a consequence of the supply of the energy-rich cooling air flow (P4, P5).

Figure 2:
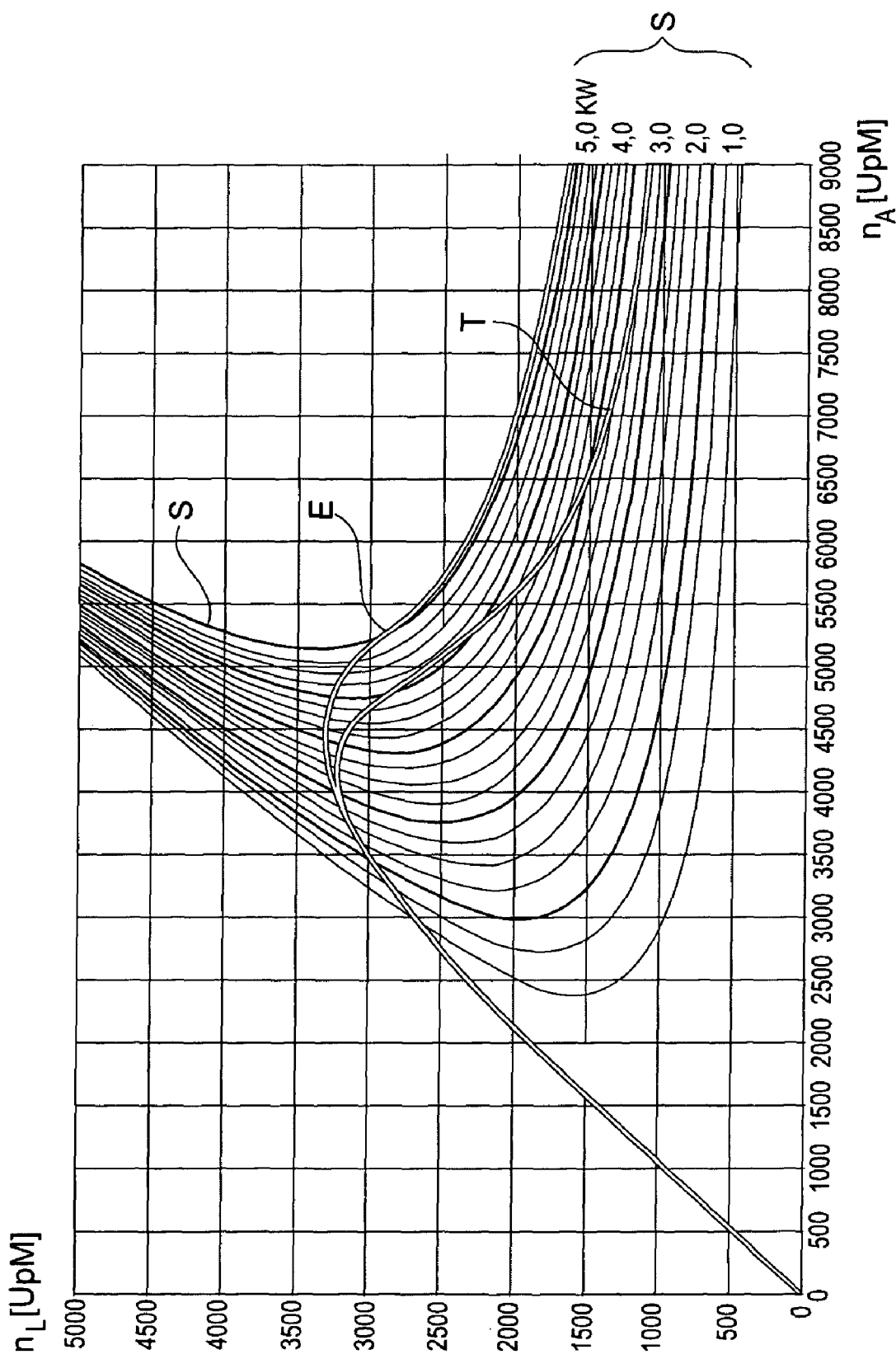
FIG. 2 is a diagram showing comparisons between the invention and the state of the art.

FIG. 2 shows a diagram wherein the fan rpm $n_L$ is plotted as a function of drive rpm $n_A$. The drive rpm $n_A$ thereby corresponds to the rpm of the drive shaft 6 and the drive disc 5 in FIG. 1 while the fan rpm $n_L$ corresponds to the rpm of the fan 3 and the rpm of the housing 4 of the fluid friction clutch 2.

A first curve T in FIG. 2 shows the course of the rpm for a fluid friction clutch according to the state of the art, that is, without additional ventilation or cooling. The fan rpm $n_L$ is always less than $n_A$ because of the slip between drive disc 5 and clutch housing 4. The slip power is dependent upon the relative rpm ($\Delta n = n_A - n_L$) and is shown as a set S of hyperbolically-shaped curves for different slip powers from 1.0 kW to 5.0 kW as shown in the diagram. The slip power is also dependent upon the transferred torque between drive disc and clutch housing and is a power loss which generates heat and heats the clutch. For a drive rpm $n_A$ of approximately 4,000 rpm, the curve T shows a maximum, that is, at a fan rpm $n_L$ between 3,000 and 3500 rpm. If the drive rpm $n_A$ is further increased, the fan rpm falls off with an initially increasing slip power, that is, increased heat development. This region should be avoided in order to maintain the operability of the clutch.

A second curve E shows the course of the rpm for the fan drive of the invention shown in FIG. 1, that is, a fan drive with an additional cooling of the rear side of the clutch via blower 13. First, that is, in a drive rpm range of 0 to approximately 3,500 rpm, both curve branches (E, T) are the same; thereafter, the curve E lies above curve T according to the state of the art. The fan drive of the invention therefore, on the one hand, permits higher drive rpms $n_A$ and, on the other hand, greater slip powers without the fan rpm $n_L$ falling off. In this way, the clutch can still be operated especially at high engine rpms (as they occur in specific operating states of the vehicle, for example, steep mountain travel) and the required cooling power (fan power) can be delivered.

In view of the embodiment of a fluid friction clutch as shown in FIG. 1, it should be noted that the invention is applicable likewise to other configurations of fluid friction clutches, for example, with a planar-shaped drive disc and axial gaps or a pot-shaped drive disc having radial gaps or further modified embodiments of work chambers or work gaps.

It is understood that the foregoing description is that of the preferred embodiments of the invention and that various changes and modifications may be made thereto without departing from the spirit and scope of the invention as defined in the appended claims.

What is claimed is:

1. A fan drive comprising:
   a drive shaft;
   a fluid friction clutch including: a drive disc and a housing;
   a bearing for rotatably journalling said housing on said drive shaft;
   a fan;
   said fan and said fluid friction clutch being arranged to facilitate a first air flow moving in a flow direction (L) toward said fan and said fluid friction clutch;
   said housing having a front-end housing part facing toward said first air flow and a rear-end housing part facing away from said first air flow;
   a blower mounted on said drive shaft so as to rotate therewith and generate a second air flow;
   an air conveying unit mounted behind said fluid friction clutch in spaced relationship to said rear-end housing part of said housing; and,
   said air conveying unit and said rear-end housing part of said housing conjointly defining an air passage between said blower and said fan for conducting said second air flow over said rear-end housing part of said housing to remove heat from said clutch.

2. The fan drive of claim 1, wherein said front-end housing part faces into said air flow and, said blower draws air in a direction opposite to said flow direction (L) and conveys the drawn-in air in a direction toward said rear-end housing part.

3. The fan drive of claim 2, wherein said fan causes a pressure region to develop rearward of said rear-end housing part; and, said blower draws air in from said pressure region.

4. The fan drive of claim 1, wherein said blower is mounted next to said bearing.

5. The fan drive of claim 1, wherein said rear-end housing part has cooling ribs formed thereon.

6. The fan drive of claim 5, wherein said cooling ribs are radially extending cooling ribs.

7. The fan drive of claim 1, wherein said front-end housing part has cooling ribs formed thereon.

8. The fan drive of claim 7, wherein said cooling ribs are radially extending cooling ribs.

9. The fan drive of claim 1, wherein said blower is configured as an axial blower, radial blower or half-axial blower.

10. The fan drive of claim 1, wherein said fan drive is for a motor vehicle.

11. A fan drive comprising:
    a drive shaft;
    a fluid friction clutch including: a drive disc and a housing;
    a bearing for rotatably journalling said housing on said drive shaft;
    a fan;
    said fan and said fluid friction clutch being arranged to facilitate an air flow moving in a flow direction (L) toward said fan and said fluid friction clutch;
    an air conveying unit mounted behind said fluid friction clutch as viewed in said flow direction (L);
    said air conveying unit being configured as a blower;
    said blower being driven by said drive shaft;
    said housing having a front-end housing part facing into said air flow and a rear-end housing part;
    said blower drawing air in a direction opposite to said flow direction (L) and conveying the drawn-in air in a direction toward said rear-end housing part;
    said blower defining a downstream air-flow region through which the air flow produced by said blower passes; and,
    said fan drive further comprising a hood-shaped air-guiding unit on the rearward side of said fluid friction clutch and in said downstream air-flow region.

12. The fan drive of claim 11, wherein said air-guiding unit is attached to said housing.

13. The fan drive of claim 12, wherein said air-guiding unit is attached to said rear-end housing part.

14. The fan drive of claim 11, wherein said air-guiding unit includes a collar disposed in surrounding relationship to said blower.

15. The fan drive of claim 11, further comprising an air-flow connection arranged between the forward and rearward sides of said fluid friction clutch.

16. The fan drive of claim 15, wherein said housing and said hood-shaped air-guiding unit conjointly define said air-flow connection as a deflection channel.

17. The fan drive of claim 15, wherein a front-end housing part and said air-guiding unit conjointly define said air-flow connection as a deflection channel.

18. The fan drive of claim 11, wherein said hood-shaped air-guiding unit is configured as a blower hub attached to said housing.

* * * * *